(12) United States Patent
Doeppner et al.

(10) Patent No.: US 10,843,770 B2
(45) Date of Patent: Nov. 24, 2020

(54) BICYCLE HAVING ELECTRIC DRIVE WITH POWER DISTRIBUTION

(71) Applicant: Mahle International GmbH, Stuttgart (DE)

(72) Inventors: Enrico Doeppner, Grossenlueder (DE); Amir Oploh, Neufahrn (DE); Sebastian Stoll, Munich (DE); Christian Wirth, Mossinning (DE)

(73) Assignee: MAHLE INTERNATIONAL GMBH (DE)

( * ) Notice: Subject to any disclaimer, the term of this patent is extended or adjusted under 35 U.S.C. 154(b) by 0 days.

(21) Appl. No.: 16/616,332

(22) PCT Filed: May 18, 2018

(86) PCT No.: PCT/EP2018/063134
§ 371 (c)(1),
(2) Date: Nov. 22, 2019

(87) PCT Pub. No.: WO2018/215346
PCT Pub. Date: Nov. 29, 2018

(65) Prior Publication Data
US 2020/0172194 A1    Jun. 4, 2020

(30) Foreign Application Priority Data

May 23, 2017   (DE) .......................... 10 2017 208 714
Sep. 1, 2017    (DE) .......................... 10 2017 215 349

(51) Int. Cl.
*B62M 6/20*     (2010.01)
*B62M 6/55*     (2010.01)
(Continued)

(52) U.S. Cl.
CPC ................ *B62M 6/20* (2013.01); *B62M 6/55* (2013.01); *B62M 11/18* (2013.01); *F16D 41/24* (2013.01); *B62M 11/04* (2013.01)

(58) Field of Classification Search
None
See application file for complete search history.

(56) References Cited

U.S. PATENT DOCUMENTS 5,845,727 A     12/1998   Miyazawa et al.
8,051,937 B2    11/2011   Pesenti
(Continued)

FOREIGN PATENT DOCUMENTS

CN    202541770 U    11/2012
CN    106458197 A     2/2017
(Continued)

OTHER PUBLICATIONS

English abstract for CN-106458197.
(Continued)

*Primary Examiner* — Colby M Hansen
(74) *Attorney, Agent, or Firm* — Fishman Stewart PLLC

(57) ABSTRACT

An electric drive for a bicycle includes an electric motor having a drive shaft, a driven shaft connected in a rotationally fixed manner to a driving gear for coupling to a wheel drive of the bicycle. The electric drive includes a transmission, which drivingly connects the drive shaft to the driven shaft. The transmission has a driven wheel, which is connected in a rotationally fixed manner to the driven shaft in a rotational drive direction, and at least two output gears, the at least two output gears including a first output gear and a second output gear, which in each case engage with the driven gear offset to one another in the circumferential direction in order to drive the driven wheel; and wherein the (Continued)

transmission has a power distribution, which divides a drive power of the electric motor to the output gears.

20 Claims, 2 Drawing Sheets

(51) Int. Cl.
*B62M 11/18* (2006.01)
*F16D 41/24* (2006.01)
*B62M 11/04* (2006.01)

(56) References Cited

U.S. PATENT DOCUMENTS

| | | | |
|---|---|---|---|
| 8,473,130 B2* | 6/2013 | Brady | B60L 53/80 |
| | | | 701/22 |
| 8,550,199 B2* | 10/2013 | Moeller | B62M 6/55 |
| | | | 180/206.3 |
| 9,643,683 B2* | 5/2017 | Laprade | B62M 6/55 |
| 9,663,177 B2* | 5/2017 | Craven | B62J 6/04 |
| 9,758,212 B2 | 9/2017 | Kimmich et al. | |
| 10,035,561 B2* | 7/2018 | Spaggiari | B62M 6/55 |
| 10,137,963 B2 | 11/2018 | Niki | |
| 10,190,648 B2 | 1/2019 | Poertzgen et al. | |
| 10,399,635 B2 | 9/2019 | Yamamoto | |
| 2013/0032425 A1* | 2/2013 | Lee | B62M 6/55 |
| | | | 180/220 |
| 2017/0137086 A1 | 5/2017 | Yamamoto | |
| 2017/0291660 A1 | 10/2017 | Deleval | |

FOREIGN PATENT DOCUMENTS

| | | |
|---|---|---|
| DE | 2750079 A1 | 11/1978 |
| DE | 102009045447 A1 | 6/2010 |
| EP | 2192317 A1 | 6/2010 |
| JP | H09-002368 A | 1/1997 |
| JP | 2016-182850 A | 10/2016 |
| JP | 2016-222123 A | 12/2016 |
| WO | 2005057053 A1 | 6/2005 |
| WO | 2016026241 A1 | 2/2016 |

OTHER PUBLICATIONS

English translation of Chinese Office Action for CN-201880034481.4, dated Jul. 2, 2020.

English translation of Japanese Office Action for JP-2019-565015, dated Jun. 16, 2020.

* cited by examiner

BICYCLE HAVING ELECTRIC DRIVE WITH POWER DISTRIBUTION

CROSS-REFERENCE TO RELATED APPLICATIONS

This application claims priority to International Patent Application No. PCT/EP2018/063134, filed on May 18, 2018, and German Patent Application No. DE 10 2017 208 714.5, filed on May 23, 2017, the contents of each of which are hereby incorporated by reference in their entirety.

TECHNICAL FIELD

The present invention relates to an electric drive or auxiliary drive, respectively, for a bicycle as well as to a bicycle, which is equipped with such an electric drive or auxiliary drive, respectively.

BACKGROUND

Bicycles comprising an electric drive are generally known as "e-bike". The electric drive can thereby serve as sole drive, thus as main drive, but preferably as auxiliary drive. In the context at hand, the term "drive" is understood as a main drive as well as an auxiliary drive. In the case of an auxiliary drive, the electric motor supports the drive power of the respective bicycle rider. In the case of a so-called "pedelec", only such a drive support takes place. An electric motor drive of the bicycle without drive power by the bicycle rider is not provided in the case of a pedelec. Provided that the drive is embodied as main drive, the bicycle can also be driven only via the electric drive. In the context at hand, the term "bicycle" is not only understood as two-wheelers, but also three-wheelers or four-wheelers.

Such an electric drive usually comprises an electric motor, which has an drive shaft. A driven shaft is further provided, which is connected in a rotationally fixed manner to a driving gear. The driving gear serves for coupling to a chain drive or belt drive or another wheel drive of the bicycle, which serves to drive a driven wheel of the bicycle, which is usually a rear wheel of the bicycle. In other words, in the installed state, the driving gear is drivingly connected to a rear wheel of the bicycle via a chain or via a belt or via a different coupling. The electric drive further comprises a transmission, which drivingly connects the drive shaft to the driven shaft. The comparatively high speed of the electric motor can thereby be reduced to the comparatively low speed of the driven shaft. The torque provided with the help of the electric motor can thus simultaneously be increased accordingly. The transmission can have, for example, a driven gear, which is connected in a rotationally fixed manner to the driven shaft in a rotational drive direction. The "wheels" of the transmission are preferably gearwheels.

Provided that the electric drive is arranged in the area of a pedal shaft, the diameter of the driven gear is limited, so that the ground clearance of the bicycle is not negatively impacted. Relatively high torques have to accordingly be applied to this driven gear. For this purpose, the transmission has, for example, an output gear, which engages with the driven gear. In the case of a conventional electric drive, driven gear and output gear have to be made of metal for the transmission of large torques. Metallic wheels are comparatively expensive and are often the cause for noise problems in the drive.

SUMMARY

The present invention deals with the problem of specifying an improved embodiment for an electric drive of the above-described type or for a bicycle equipped therewith, respectively, which is characterized in particular by a cost-efficient producibility and/or by a reduced noise development.

This problem is solved according to the invention by means of the subject matter of the independent claim. Advantageous embodiments are the subject matter of the dependent claims.

The invention is based on the general idea of equipping the transmission with at least two output gears, which serve to drive the driven gear and which, for this purpose, in each case individually engage with the driven gear. For this purpose, the at least two output gears are arranged on the circumference of the driven gear, offset to one another in the circumferential direction. A power distribution, which distributes a drive power of the electric motor to the at least two output gears, is furthermore realized in the transmission. These measures have the result that the torque, which is to be applied as a whole to the driven gear, is distributed to at least two engagement points, namely to the engagement points of the at least two output gears. The load of the driven gear and of the respective output gear is thereby significantly reduced in the respective engagement. In the case of an even power distribution to exactly two output gears, the torque is halved in the respective engagement point. The at least two output gears, which will be referred to hereinafter as "first output gear" and "second output gear", thus in each case individually introduce a portion of the drive power into the driven gear. Due to the significantly reduced torques at the respective engagement point, it is possible in particular to make the output gears and/or the driven gear of plastic. The production costs can therefore be reduced. The risk of a noise development is furthermore reduced.

It can advantageously be provided that a first axis of rotation, about which the first output gear rotates, and a second axis of rotation, about which the second output gear rotates, are arranged inside the transmission in a stationary manner. A compact design, which can be realized easily, is attained thereby.

An embodiment is particularly advantageous, in the case of which a first axis of rotation, about which the first output gear rotates, and a second axis of rotation, about which the second output gear rotates, are arranged geometrically between an output axis, about which the driven shaft rotates, and an input axis, about which the drive shaft rotates. On the one hand, a compact design is supported thereby. On the other hand, the ground clearance for the bicycle in the area of the drive can be increased thereby. In the installed state, the drive is arranged essentially above a pedal shaft of the bicycle, when the bicycle stands or moves on a surface. In this installed state, the driven shaft is located in the area of the pedal shaft and thus forms the lowest area of the drive. In the installed state, the output gears are thus located above the driven shaft and below the drive shaft.

According to a particularly advantageous embodiment, the transmission can have a planetary transmission. This planetary transmission can now be coupled to the drive shaft on the input side, e.g. via a corresponding toothing or transmission stage, and to the output gears on the output side via the power distribution. The power distribution is then ultimately formed by the output gears and the output side of the planetary transmission or by the coupling of the output gears to the output side of the planetary transmission, respectively.

Such a planetary transmission can have a sun gear, at least two planet gears, a planet carrier, and a ring gear. The sun gear and the ring gear are drivingly connected to one another in the usual way via the planet gears supported on the planet carrier. Such a planetary transmission is characterized by an extremely compact design and large transmission. Inside the planetary transmission, the sun gear, which forms the input side of the planetary transmission, performs an internal power distribution via the planet gears on the planet carrier and/or on the ring gear, which internal power distribution is provided in addition to the power distribution in question, which distributes the drive power of the planetary transmission on the output side to the output gear. The output side of the planetary transmission is thereby formed by the planet carrier and/or the ring gear.

In other words, the power distribution introduced here, which distributes the drive power to the output gears, is present in addition to the power distribution, which is embodied inside the planetary transmission.

An embodiment is now advantageous, in the case of which the ring gear is connected in a rotationally fixed manner to the first output gear. As a result, the sun gear is driven via the electric motor. The ring gear then drives the first output gear with significantly reduced speed.

A further development is particularly advantageous, in the case of which the planet carrier is connected in a rotationally fixed manner to an intermediate gear, which engages with the second output gear. In the case of this embodiment, the planet carrier, which also rotates when the sun gear rotates, is used to drive the second output gear. The power distribution of the transmission therefore takes place inside the planetary transmission. The intermediate gear is thereby required in order to synchronize the direction of rotation of the two output gears. The ratio of the power distribution to the two output gears can further be adjusted via the dimensioning, thus via diameter and number of teeth, of the intermediate gear and, as a result, also of the second output gear. A power distribution in the ratio 1:1 is preferred thereby, so that the two output gears each transmit 50% of the drive power to the driven gear.

Another further development proposes that the sun gear is connected in a rotationally fixed manner to a sun shaft, which is connected in a rotationally fixed manner to an input gear. The drive shaft of the electric motor, in turn, is connected in a rotationally fixed manner to a drive gear, which engages with the input gear. The engagement of drive gear and input gear is advantageously configured as spur gear transmission. In the case of a spur gear transmission, the two wheels are radially engaged with one another via their teeth. The engagement of the two output gears with the driven gear is in each case advantageously also configured as spur gear transmission. The second output gear can also form such a spur gear transmission with the intermediate gear.

According to a particularly advantageous embodiment, the output gears can now be plastic gears. Additionally or alternatively, the driven gear can be a plastic gear. It is clear that fiber-reinforced plastics can be used here.

The driven gear can advantageously be connected to the driven shaft via a freewheel assembly, which transmits a torque from the driven gear to the driven shaft in the rotational drive direction, and which allows for a relative rotation between driven gear and driven shaft in a counter-rotational direction opposite to the rotational drive direction. The driven shaft can thus in particular rotate quicker in the rotational drive direction than the driven gear.

Another embodiment proposes that the driven shaft is embodied as hollow shaft and is coaxially permeated by a pedal shaft. In the operational installed state, thus on the bicycle, this pedal shaft is in each case provided with a pedal crank on its longitudinal ends, wherein the respective pedal crank in each case supports a pedal, so that the bicycle rider can introduce his drive power into the drive via the pedals, pedal cranks, and pedal shaft. For this purpose, the pedal shaft is connected in a rotationally fixed manner to the driven shaft in the rotational drive direction.

The pedal shaft can preferably be connected to the driven shaft via a freewheel assembly, which transmits a torque from the pedal shaft to the driven shaft in the rotational drive direction, and which allows for a relative rotation between pedal shaft and driven shaft in a counter-rotational direction opposite to the rotational drive direction. With the help of this freewheel assembly, the driven shaft can rotate quicker in the rotational drive direction than the pedal shaft. The pedal shaft can likewise be rotated with a direction of rotation opposite the direction of rotation of the driven shaft.

Another embodiment proposes that the drive shaft rotates about an input axis, while the driven shaft rotates about an output axis. The arrangement of electric motor and driven shaft thereby takes place in such a way that the input axis runs parallel to the output axis, while a radial distance between input axis and output axis is simultaneously maintained. Based on an installation situation on the bicycle, the electric motor is in particular arranged above the drive shaft, thus on a side of the driven shaft facing away from a surface, on which the bicycle stands.

In the context at hand, a "shaft" is understood to be a physical component, while an "axis" is understood to be an imaginary straight line. In the case of a rotating shaft, the corresponding axis of rotation thus coincides with the longitudinal central axis of the shaft.

The output gears are advantageously arranged geometrically between the drive shaft and the driven shaft. Apart from the driven gear, the transmission thus builds only above the driven shaft, which benefits the ground clearance of the bicycle.

In addition to at least one front wheel and at least one rear wheel, a bicycle according to the invention comprises a pedal shaft, a wheel drive, such as, e.g., a chain drive or a belt drive, as well as an electric drive of the above-described type. The pedal shaft can thereby also belong to the structural volume of the drive. The wheel drive serves to drive a driven wheel of the bicycle, which is usually a rear wheel.

A design is preferred, in the case of which the output gears are arranged on a side of the driven shaft facing away from the surface, when the bicycle stands or moves on a surface. The bicycle thereby gains ground clearance in the area of the drive.

A design is particularly advantageous, in the case of which, apart from the driven gear, the transmission is arranged above the driven shaft, when the bicycle stands or moves on a surface.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, wherein identical reference numerals refer to identical or similar or functionally identical components.

BRIEF DESCRIPTION OF THE DRAWINGS

In each case schematically.

DETAILED DESCRIPTION

Figure 1:
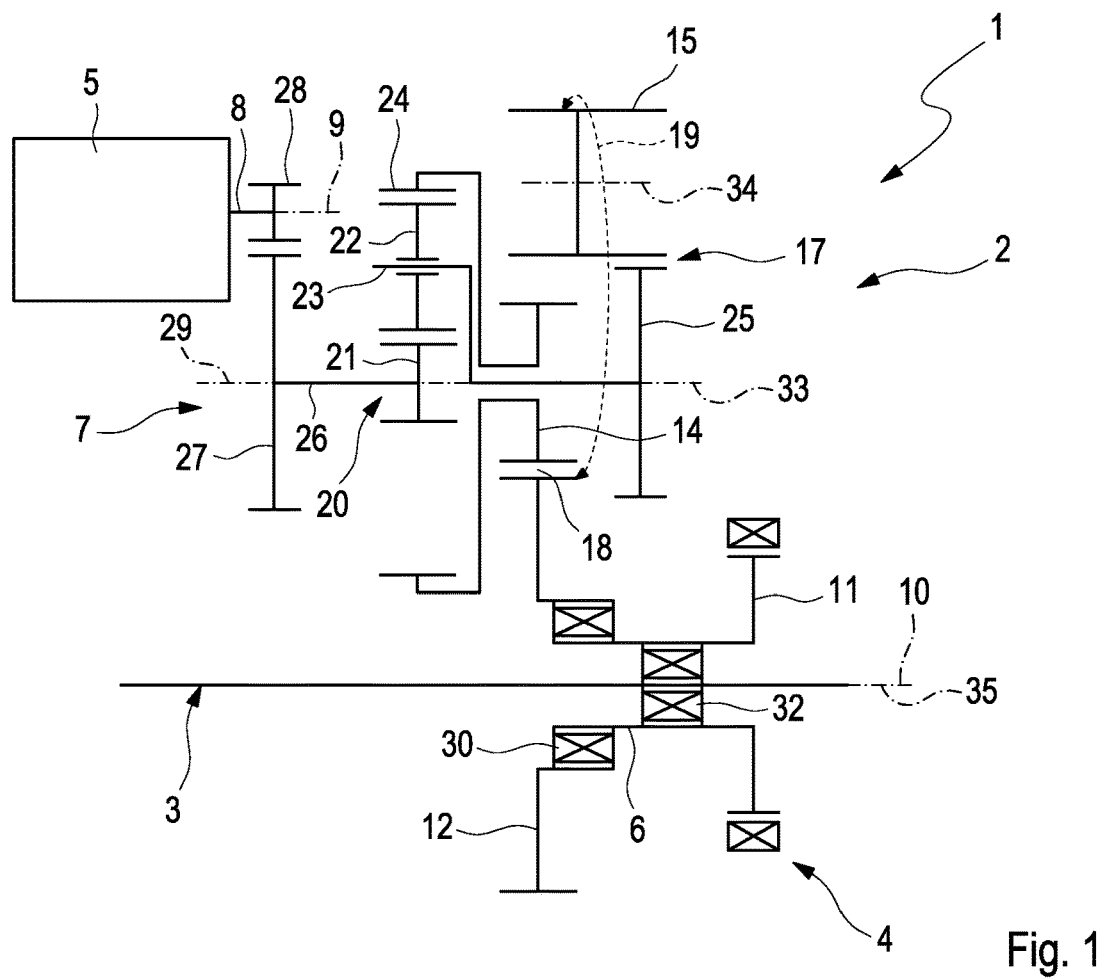
FIG. 1 shows a schematic diagram of an electric drive.

According to FIG. 1, a bicycle 1, which is illustrated only in the area of an electric drive 2 here, comprises a pedal shaft 3 as well as a wheel drive 4, which is preferably embodied as chain drive 4 or as belt drive 4. A universal drive 4 is generally also conceivable. The wheel drive 4 serves to drive a driven wheel, which is not shown here, of the bicycle 1, which is preferably a rear wheel of the bicycle 1. The bicycle 1 furthermore comprises the above-mentioned drive 2. In the completely mounted state of the bicycle 1, the pedal shaft 3, which is part of the structural volume of the drive 2 here, is in each case connected in a rotationally fixed manner to a pedal crank, which is not shown here, on its longitudinal ends, on which a pedal is in each case located, which is also not shown here.

According to FIGS. 1 to 4, the electric drive 2 has an electric motor 5, a driven shaft 6, and a transmission 7. The electric motor 5 has a drive shaft 8, which rotates about an input axis 9. The driven shaft 6 rotates about an output axis 10 and is connected in a rotationally fixed manner to a driving gear 11, preferably a gearwheel. Via the driving gear 11, the drive 2 is connected to the wheel drive 4, in particular to the chain drive 4 or to the belt drive 4, respectively, or to the universal drive 4, respectively.

The transmission 7 comprises a driven gear 12, preferably a gearwheel, which is connected in a rotationally fixed manner to the output shaft 6 in a rotational drive direction 13 suggested by means of an arrow. The driven gear 12 rotates about a third axis of rotation 35, which coincides with the output axis 10 of the driven shaft 6 here. The transmission 7 further has at least two output gears, preferably a gearwheel each, namely a first output gear 14 and a second output gear 15. In the case of other examples, more than two output gears 14, 15 can also be present. The respective output gear 14, 15 serves to drive the driven gear 12 and engages with the driven gear 12 for this purpose. The two output gears 14, 15 are thereby arranged offset to one another on the driven gear 12 in the circumferential direction 16 of the driven gear 12 as suggested by a double arrow in FIG. 2. The first output gear 14 thereby rotates about a first axis of rotation 33, while the second output gear 15 rotates about a second axis of rotation 34. These axes of rotation 33, 34 are stationary, i.e., the two axes of rotation 33, 34 are arranged in a stationary manner inside the transmission 7. In other words, the two axes of rotation 33, 34 do not change their spatial position inside the transmission 7 during operation of the drive 2. The transmission 7 is equipped with a power distribution 17, which makes it possible to distribute a drive power of the electric motor 5 to the output gears 14, 15.

Figure 2:
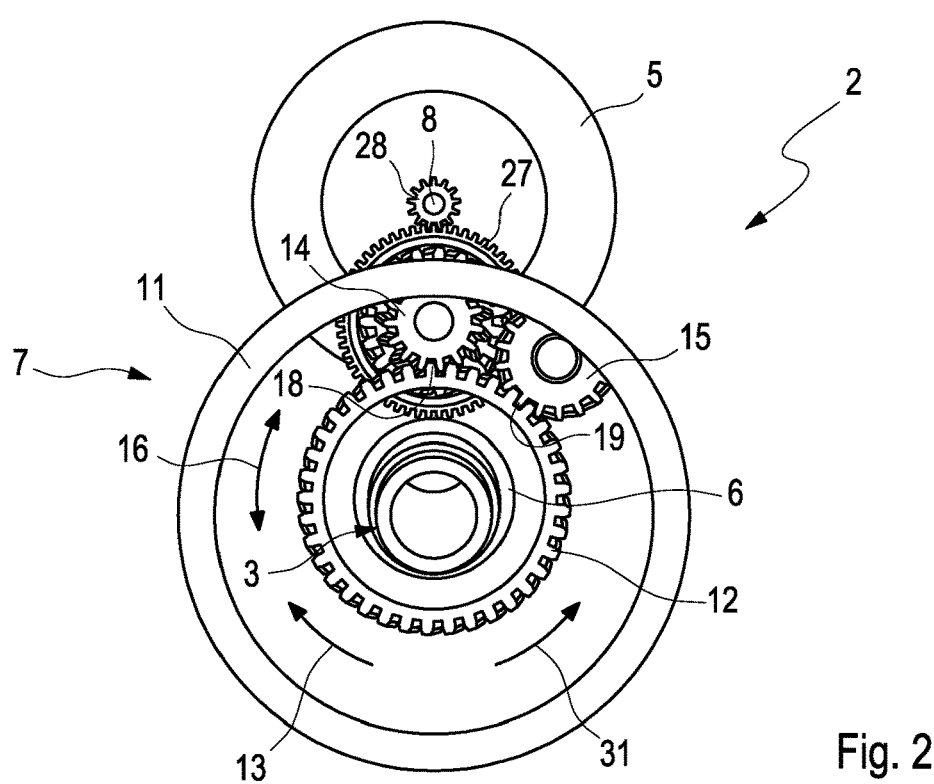
FIGS. 2 to 4 each show an isometric view onto pats of the drive in different viewing directions.
Figure 3:
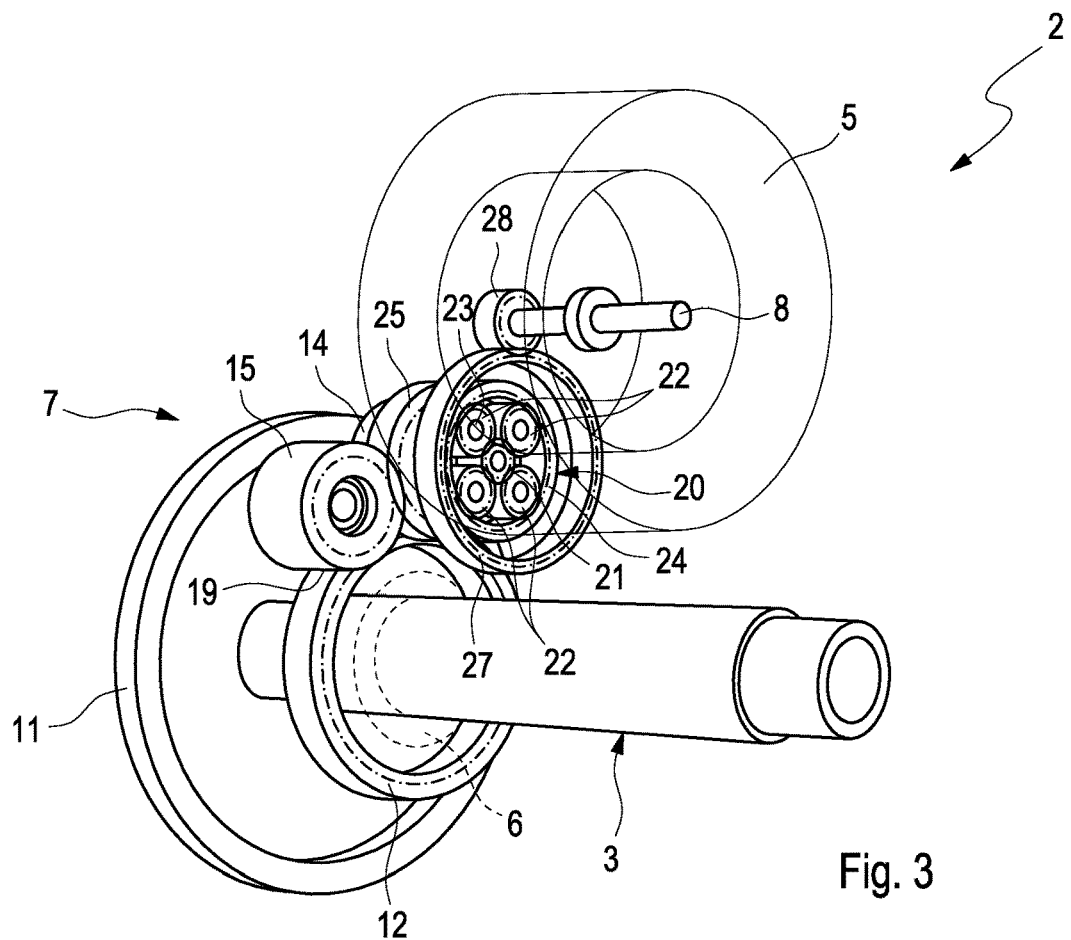
Figure 4:
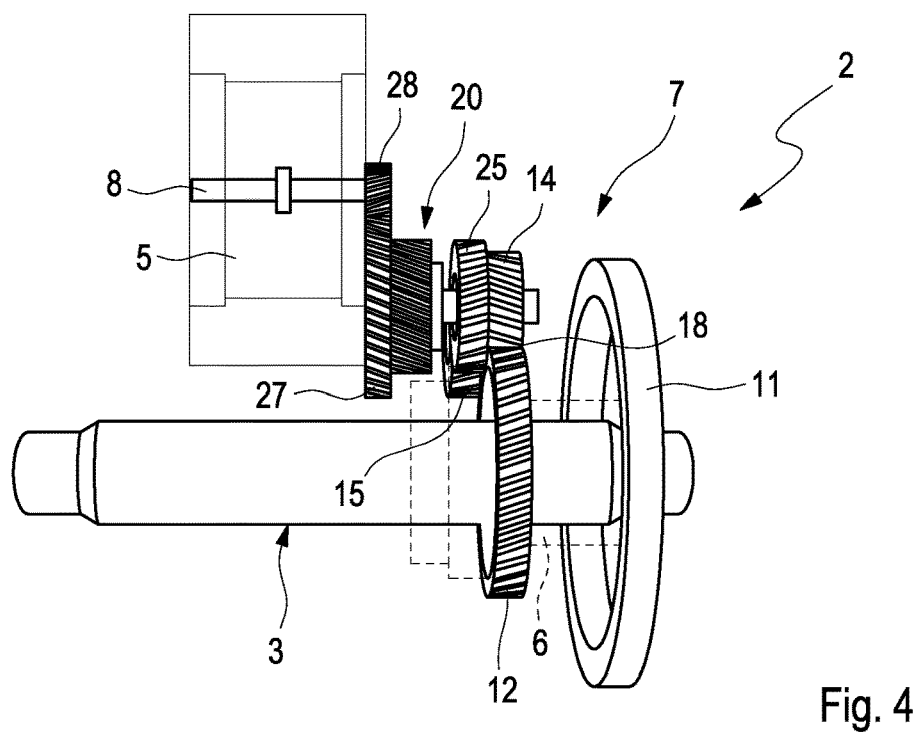

It can be seen well in FIG. 2, how the two output gears 14, 15 in each case individually engage with the driven gear 12, spaced apart from one another in the circumferential direction 16. The load of the respective engagement point is thereby significantly reduced. A first engagement point between the first output gear 14 and the driven gear 12 is thereby identified with 18, while a second engagement point between the second output gear 15 and the driven gear 12 is identified with 19. The first engagement point 18 between first output gear 14 and driven gear 12 can be seen immediately in the highly schematized side view of FIG. 1. The second engagement point 19 between second output gear 15 and driven gear 12, in contrast, cannot be seen immediately in this view and is accordingly symbolized by means of an operative connection suggested with a broken line.

It can further be seen in FIG. 2 that the output gears 14, 15 are arranged geometrically between the drive shaft 8 and the driven shaft 6. In the installed state of the drive 2, the drive shaft 8 is located on a side of the driven shaft 6 facing away from a surface, which is not shown here, when the bicycle 1 stands or moves on this surface. Apart from the driven gear 12, the entire remaining transmission 7 is thus located above the driven shaft 6.

In the case of the preferred example shown here, the transmission 7 has a planetary transmission 20. This planetary transmission 20 has a sun gear 21, at least two planet gears 22, a planet carrier 23, as well as a ring gear 24, all gears are preferably gearwheels. The sun gear 21 is coaxially arranged in the ring gear 24 and is drivingly connected thereto via the planet gears 22. For this purpose, the planet gears 22 engage with the sun gear 21 radially on the inside and with the ring gear 24 radially on the outside. In the example, exactly four planet gears 22 are provided.

The sun gear 24 is connected in a rotationally fixed manner to the first output gear 14. As a result, the sun gear 24 drives the driven wheel 12 via the first output gear 14. It is further provided here that the planet carrier 23 is connected in a rotationally fixed manner to an intermediate gear 25, wherein this intermediate gear 25 engages with the second output gear 15. The planet carrier 23 thus also drives the driven gear 12 via the intermediate gear 25 and the second output gear 15. The power distribution 17 is advantageously designed in such a way that the power of the electric motor 5 is distributed equally to the two output gears 14, 15. For this purpose, the intermediate gear 25 is selected in such a way with regard to diameter and number of teeth that a synchronization in the direction of rotation and speed results for the two output gears 14, 15.

The sun gear 21 is advantageously connected in a rotationally fixed manner to a sun shaft 26, which, in turn, is connected in a rotationally fixed manner to an input gear 27, preferably a gearwheel. The drive shaft 8 of the electric motor 5 is connected in a rotationally fixed manner to a drive gear 28, preferably a gearwheel, which engages with the input gear 27. The sun shaft 26 thereby extends coaxially to a sun axis 29 of the planetary transmission 20, which runs parallel to the input axis 9 and to the output axis 10.

Due to the reduced mechanical load of the engagement points 18, 19, it is possible according to an advantageous embodiment to embody the two output gears 14, 15 and/or the driven gear 12 as plastic gears.

The driven gear 12 is advantageously connected to the driven shaft 6 via a freewheel assembly 30. This freewheel assembly 30 transmits a torque from the driven gear 12 to the driven shaft 6 in the rotational drive direction 13. In a counter-rotational direction 31, which is suggested by means of an arrow in FIG. 2, which is oriented opposite to the rotational drive direction 13, the freewheel assembly 30, in contrast, allows for relative rotations between driven gear 12 and driven shaft 6. The driven shaft 6, for example, can thereby rotate in the rotational drive direction 13, while the driven gear 12 stands still or rotates with a lower speed than the driven shaft 6 in the rotational drive direction 13.

The driven shaft 6 is advantageously embodied as hollow shaft and is coaxially permeated by the pedal shaft 3. The pedal shaft 3 is connected in a rotationally fixed manner to the driven shaft 6 in the rotational drive direction 13. The pedal shaft 3 is advantageously connected to the driven shaft 6 via a further freewheel assembly 32. This further freewheel assembly 32 operates between driven gear 12 and driven shaft 6 in the same way as the above-described freewheel assembly 30. The further freewheel assembly 32 accordingly transmits a torque from the pedal shaft 3 to the driven shaft 6 in the rotational drive direction 13, while it allows for a relative rotation between pedal shaft 3 and driven shaft 6 in the counter-rotational direction 31. The driven shaft 6 can thereby rotate in the rotational drive direction 13, while the pedal shaft 3 stands still or rotates in the counter-rotational direction 31 or rotates with a lower speed than the driven shaft 6 in the rotational drive direction 13.

Input axis 9 and output axis 10 advantageously run parallel to one another, but radially spaced apart from one another. The sun axis 29 also extends parallel to the input axis 9 and parallel to the output axis 10. The sun axis 29 thereby in particular extends geometrically between the input axis 9 and the output axis 10. As can be gathered in FIG. 2, the input axis 9, output axis 10, and sun axis 29 can preferably extend in a common plane. The arrangement of electric motor 5 and transmission 7 further takes place in such a way that the output gears 14, 15 are arranged geometrically between the drive shaft 9 and the driven shaft 6. In the installed state, the output gears 14, 15 are located above the driven shaft 6. The electric motor 5, also above the driven shaft 6, drives the drive shaft 8. The drive shaft 8 is thereby advantageously part of an internal rotor of the electric motor 5.

The invention claimed is:

1. An electric drive for a bicycle, comprising:
   an electric motor having a drive shaft;
   a driven shaft connected in a rotationally fixed manner to a driving gear for coupling to a wheel drive of the bicycle;
   a transmission, which drivingly connects the drive shaft to the driven shaft;
   wherein the transmission has a driven wheel, which is connected in a rotationally fixed manner to the driven shaft in a rotational drive direction, and at least two output gears, the at least two output gears including a first output gear and a second output gear, which in each case engage with the driven gear offset to one another in the circumferential direction in order to drive the driven wheel; and
   wherein the transmission has a power distribution, which divides a drive power of the electric motor to the output gears.

2. The electric drive according to claim 1, wherein the transmission has a planetary transmission, which is coupled to the drive shaft on an input side, and to the output gears on an output side via the power distribution.

3. The electric drive according to claim 2, wherein a first axis of rotation, about which the first output gear rotates, and a second axis of rotation, about which the second output gear rotates, are arranged inside the transmission in a stationary manner.

4. The electric drive according to claim 2, wherein a first axis of rotation, about which the first output gear rotates, and a second axis of rotation, about which the second output gear rotates, are arranged geometrically between an output axis, about which the driven shaft rotates, and an input axis, about which the drive shaft rotates.

5. The electric drive according to claim 1, wherein:
   the transmission has a planetary transmission, which has a sun gear, at least two planet gears, a planet carrier, and a ring gear;
   the ring gear is connected in a rotationally fixed manner to the first output gear.

6. The electric drive according to claim 5, wherein the planet carrier is connected in a rotationally fixed manner to an intermediate gear, which engages with the second output gear.

7. The electric drive according to claim 6, wherein:
   the sun gear is connected in a rotationally fixed manner to a sun shaft, which is connected in a rotationally fixed manner to an input wheel; and
   the drive shaft is connected in a rotationally fixed manner to a drive gear, which engages with the input gear.

8. The electric drive according to claim 7, wherein the output gears are plastic gears.

9. The electric drive according to claim 1, wherein the driven gear is connected to the driven shaft via a freewheel assembly, which transmits a torque from the driven gear to the driven shaft in the rotational drive direction, and which allows for a relative rotation between driven gear and driven shaft in a counter-rotational direction opposite to the rotational drive direction.

10. The electric drive according to claim 1, wherein:
    the driven shaft is a hollow shaft and is coaxially permeated by a pedal shaft; and
    the pedal shaft is connected in a rotationally fixed manner to the driven shaft in the rotational drive direction.

11. The electric drive according to claim 10, wherein the pedal shaft is connected to the driven shaft via a freewheel assembly, which transmits a torque from the pedal shaft to the driven shaft in the rotational drive direction, and allows for a relative rotation between the pedal shaft and the driven shaft in a counter-rotational direction opposite to the rotational drive direction.

12. The electric drive according to claim 11, wherein:
    the drive shaft rotates about an input axis;
    the driven shaft rotates about an output axis; and
    the input axis extends parallel to the output axis and is arranged radially spaced apart therefrom.

13. The electric drive according to claim 1, wherein the output gears are arranged geometrically between the drive shaft and the driven shaft.

14. A bicycle, comprising:
    a pedal shaft;
    a wheel drive for driving a driven wheel of the bicycle; and
    an electric drive according to claim 1.

15. The bicycle according to claim 14, wherein the output gears are arranged on a side of the driven shaft facing away from a surface when the bicycle stands or moves on the surface.

16. The bicycle according to claim 15, wherein, apart from the driven gear, the transmission is arranged above the driven shaft, when the bicycle stands or moves on the surface.

17. An electric drive for a bicycle, comprising:
    an electric motor having a drive shaft;
    a driven shaft connected in a rotationally fixed manner to a driving gear for coupling to a wheel drive of the bicycle; and
    a transmission that connects the drive shaft to the driven shaft, the transmission having a driven wheel connected in a rotationally fixed manner to the driven shaft, and at least two output gears that include a first output gear and a second output gear, the first output gear and the second output gear each engaging with the driven gear and are offset to one another in the circumferential direction to drive the driven wheel, wherein the transmission has a power distribution that divides a drive power of the electric motor to the output gears, the transmission having a planetary transmission coupled to the drive shaft on an input side, and to the output gears on an output side via the power distribution.

18. The electric drive according to claim 17, wherein a first axis of rotation, about which the first output gear rotates, and a second axis of rotation, about which the second output gear rotates, are arranged inside the transmission in a stationary manner.

19. The electric drive according to claim 17, wherein a first axis of rotation, about which the first output gear rotates, and a second axis of rotation, about which the second output gear rotates, are arranged geometrically between an output axis, about which the driven shaft rotates, and an input axis, about which the drive shaft rotates.

20. The electric drive according to claim 17, wherein the planetary transmission has a sun gear, at least two planet gears, a planet carrier, and a ring gear, and the ring gear is connected in a rotationally fixed manner to the first output gear.

* * * * *